US008484787B2

(12) United States Patent
Voyiadjis et al.

(10) Patent No.: US 8,484,787 B2
(45) Date of Patent: Jul. 16, 2013

(54) FENDERS FOR PIER PROTECTION AGAINST VESSEL COLLISION

(75) Inventors: George Z. Voyiadjis, Baton Rouge, LA (US); Sherif El-Tawil, Ann Arbor, MI (US)

(73) Assignee: Board of Supervisors of Louisiana State University and Agricultural and Mechanics College, Baton Rouge, LA (US)

( * ) Notice: Subject to any disclaimer, the term of this patent is extended or adjusted under 35 U.S.C. 154(b) by 211 days.

(21) Appl. No.: 12/729,779

(22) Filed: Mar. 23, 2010

(65) Prior Publication Data

US 2010/0287715 A1 Nov. 18, 2010

Related U.S. Application Data

(60) Provisional application No. 61/210,971, filed on Mar. 25, 2009.

(51) Int. Cl.
*E01D 19/02* (2006.01)

(52) U.S. Cl.
USPC ........................................ 14/76; 14/75; 14/78

(58) Field of Classification Search
CPC ...................................................... E01D 19/02
USPC ..................... 404/6, 9, 10; 14/76; 114/219; 405/211–216
See application file for complete search history.

(56) References Cited

U.S. PATENT DOCUMENTS

| 3,674,115 | A | * | 7/1972 | Young et al. .................... 404/6 |
| 3,853,084 | A | * | 12/1974 | Kedar ............................ 114/219 |
| 3,864,922 | A | * | 2/1975 | Dial et al. ....................... 405/215 |
| 4,137,861 | A | * | 2/1979 | Brummenaes ................. 114/219 |
| 4,285,616 | A | * | 8/1981 | Evetts ............................. 405/215 |
| 4,321,989 | A | * | 3/1982 | Meinzer ......................... 188/377 |
| 4,352,484 | A | * | 10/1982 | Gertz et al. ................... 256/13.1 |
| 4,452,431 | A | * | 6/1984 | Stephens et al. ............. 256/13.1 |
| 4,645,375 | A | | 2/1987 | Carney, III |
| 4,650,371 | A | * | 3/1987 | Sawaragi et al. ............. 405/211 |
| 4,674,911 | A | * | 6/1987 | Gertz ................................. 404/6 |
| 4,884,919 | A | * | 12/1989 | Moore ........................... 405/212 |
| 5,123,775 | A | * | 6/1992 | Bryant .............................. 404/6 |
| 5,127,354 | A | * | 7/1992 | Magrab et al. ................ 114/219 |
| 5,851,005 | A | * | 12/1998 | Muller et al. ................. 256/13.1 |
| 5,915,876 | A | * | 6/1999 | Barbazza ........................... 404/6 |
| 6,004,066 | A | * | 12/1999 | Niemerski ........................ 404/6 |
| 6,536,986 | B1 | | 3/2003 | Muller et al. |
| 6,551,010 | B1 | * | 4/2003 | Kiedaisch et al. ................ 404/6 |
| 6,692,191 | B2 | * | 2/2004 | Kiedaisch et al. ............ 405/215 |
| 6,811,144 | B2 | * | 11/2004 | Denman et al. ............. 256/13.1 |
| 6,863,467 | B2 | * | 3/2005 | Buehler et al. .................... 404/6 |

(Continued)

*Primary Examiner* — Raymond W Addie

(74) *Attorney, Agent, or Firm* — Jason P. Mueller; Adams and Reese LLP

(57) ABSTRACT

A system is disclosed for protecting supporting structures, such as those of a bridge or other such marine supporting structure, from the force of an impact of a vehicle/vessel. Such a system includes a plurality of modular components arranged in series and configured to dissipate the energy of the force through the progressive buckling of one or more of the modular components. Each modular component contains an energy dissipation unit that includes a plurality of adjacent cells. The energy of the force is dissipated in the buckling of the walls of the cells of the energy dissipation units through the formation of one or more plastic hinges and/or volume reduction of the cells.

38 Claims, 16 Drawing Sheets

U.S. PATENT DOCUMENTS

| | | |
|---|---|---|
| 7,100,752 B2 * | 9/2006 | Reid et al. .................... 188/371 |
| 7,112,004 B2 * | 9/2006 | Alberson et al. ................. 404/6 |
| 7,396,184 B2 * | 7/2008 | La Turner et al. ............... 404/6 |
| 7,481,600 B2 * | 1/2009 | Barton ........................... 404/10 |
| 7,794,174 B2 * | 9/2010 | McKenney et al. ............... 404/6 |
| 2003/0081997 A1 * | 5/2003 | Kramer ............................ 404/6 |
| 2007/0286675 A1 * | 12/2007 | Kennedy et al. ................. 404/6 |
| 2011/0091273 A1 * | 4/2011 | Sayre et al. ..................... 404/6 |

* cited by examiner

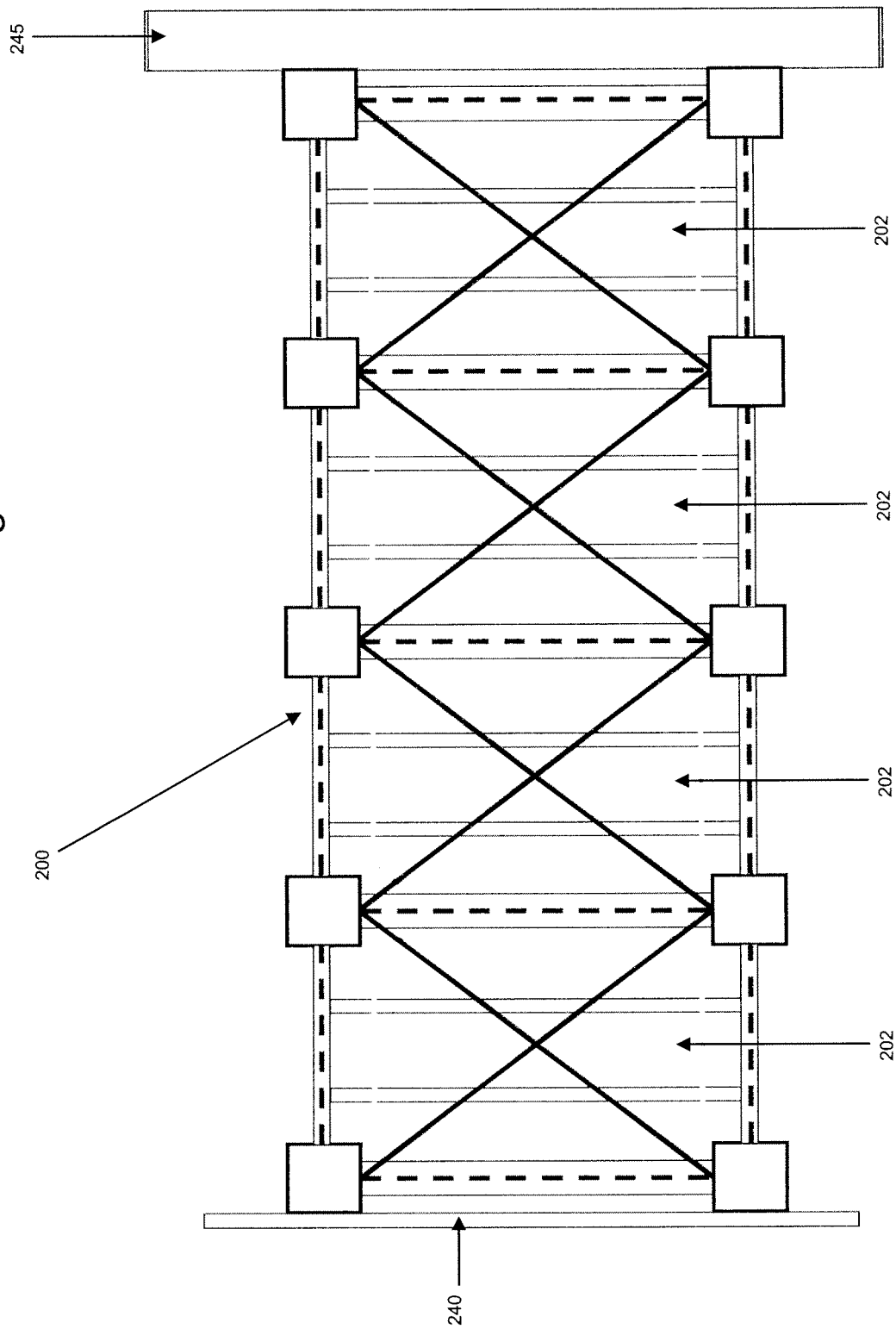

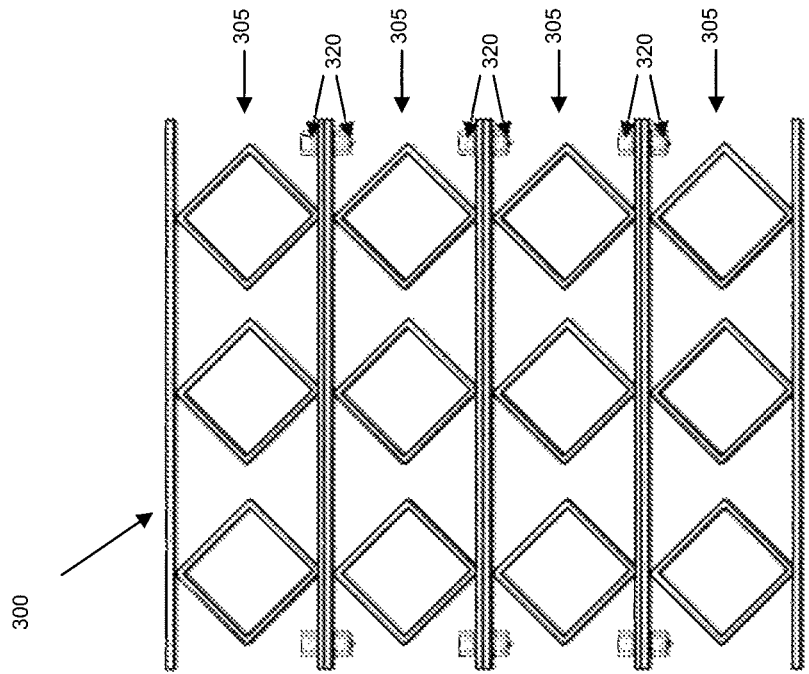
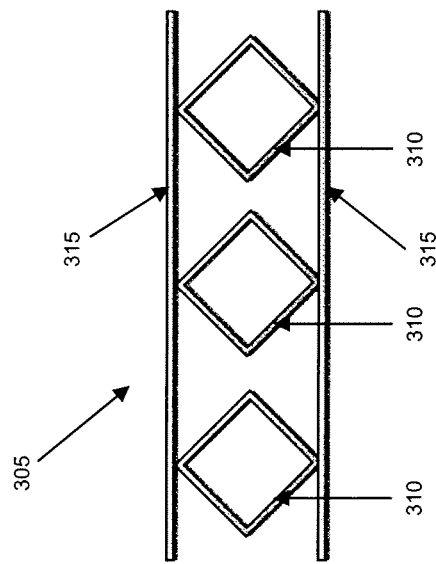

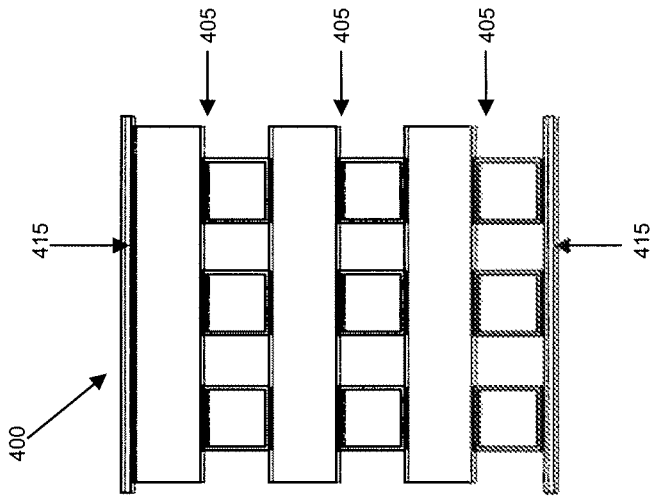
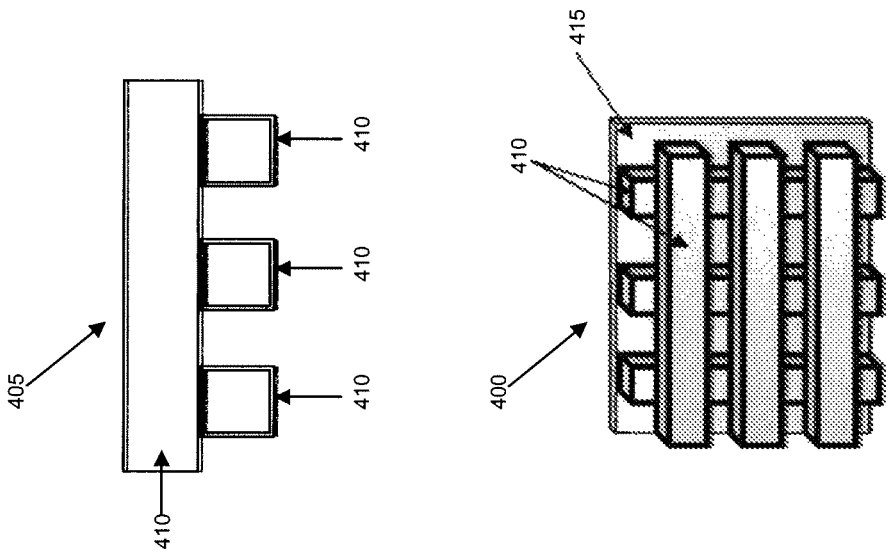

FENDERS FOR PIER PROTECTION AGAINST VESSEL COLLISION

CROSS-REFERENCE TO RELATED APPLICATIONS

This application claims the benefit of U.S. Provisional Patent Application Ser. No. 61/210,971 filed on Mar. 25, 2009 which is expressly incorporated herein in its entirety by reference thereto.

STATEMENT OF GOVERNMENT-SPONSORED RESEARCH

This invention was made with government support under the following contracts:
LTRC Project Number 06-1ST
State Project Number 736-99-1374
The government has certain rights in the invention.

FIELD

The present invention relates generally to the protection of structures and particularly to a system of energy absorbing devices that provide protection of bridge piers against the impact of vessels.

BACKGROUND

Vessel collisions with bridges are increasing at an alarming rate. In the United States, rigorous design of bridges for vessel collision has been a major concern. Indeed, models have been developed to determine vessel collision forces required for designing bridge elements. What has not been adequately addressed, however, is the design of pier protection systems. Given the high number of bridge structures in navigable waterways, bridge pier protection is a serious concern.

Timber piles are key components in many existing bridge fender protection systems. Timber piles, however, suffer from a number of drawbacks including:
1) Inadequate protection for medium and high energy collisions and susceptibility to damage in low energy collisions;
2) Susceptibility to attacks by marine borers;
3) Relatively short service life;
4) Disposability problems for damaged piles that have been replaced; and
5) Environmental concerns regarding chemically treated timber that can leach hazardous chemicals into the water.

Fiber-reinforced polymer (FRP) compositions provide alternatives to timber piles that mitigate some of the environmental hazards associated with timber piles. However, FRP piles do not provide sufficient protection against many collisions. Thus, there is a need for bridge protections systems with acceptable collision performance.

Vessel protection systems are different from typical roadside safety hardware such as vehicle crash cushions. Roadside safety hardware is primarily used to protect vehicle occupants during a crash. Vessel protection systems, in contrast, are designed to protect a bridge against excessive collision forces and, at the same time, are suppose to prevent an errant vessel from sinking or from being damaged to the point where its cargo is released into the environment. This is important because barges and vessels frequently carry cargo that could pollute and damage the environment. Another difference is that vehicle cushions are inevitably struck at high speed and must therefore fully deploy after every accident. As a result they must be repaired or reset after each impact. On the other hand, vessel protection system will be struck many times and at various speeds by floating vessels and must therefore be designed to deploy only in severe impact cases, e.g. when the applied impact force exceeds a given threshold. A third major difference between the vessel protection systems and roadside safety hardware is the type of loading that is generated. Vehicle protection systems are typically subjected to high speed impact loads generated from relatively light vehicles while vessel protection systems are typically subjected to low speed impact loads generated by heavily loaded vessels.

SUMMARY

According to an exemplary embodiment of the present invention, a system is provided for protecting a structure from an applied force that includes a plurality of modular components configured between a first end and a second end, wherein each modular components contains an energy dissipation unit positioned therein that includes a plurality of adjacent cells. The system is configured to dissipate energy introduced from an external force through the progressive buckling of one or more of the modular components and the buckling of at least one cell wall.

BRIEF DESCRIPTION OF THE DRAWINGS

FIG. 2b is a plan view of a protection system incorporating a plurality of the modular component of FIG. 2a according to an exemplary embodiment of the present invention.

FIGS. 3a, 3b, 3c and 3d are plan views of an energy dissipation unit and components thereof according to exemplary embodiments of the present invention.

FIGS. 4a, 4b and 4c are plan and isometric views of an energy dissipation unit and components thereof according to exemplary embodiments of the present invention.

DETAILED DESCRIPTION

Figure 1A:
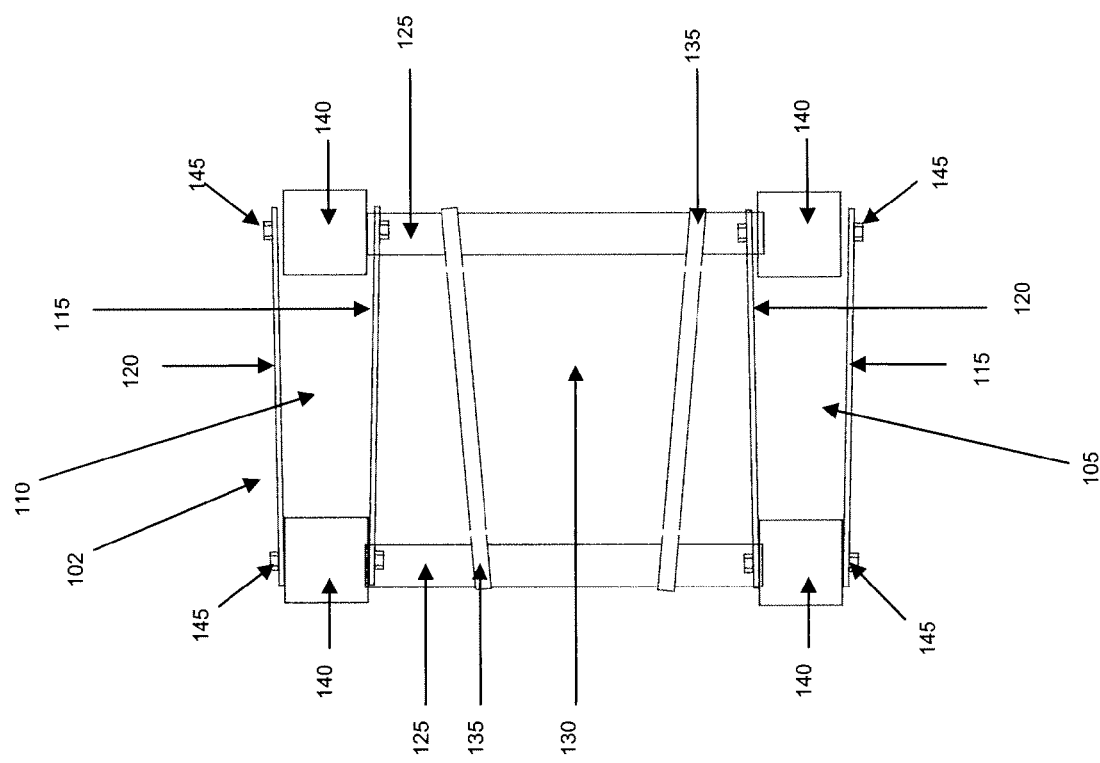
FIG. 1a is a plan view of a modular component of a protection system according to an exemplary embodiment of the present invention.

Embodiments of the present invention provide advantages over existing systems. Some advantages include: modular design; easy installation or replacement; suitability for retrofitting to existing bridges or with new construction; crashworthiness, e.g., highly damage tolerant with good energy absorption and stiffness characteristics; and durability with low life-cycle costs.

Accordingly to an exemplary embodiment of the present invention, a marine structure protection system may include modular components that can be mounted on a bridge pier that provide protection against the impact of a vessel. The modular units provide protection by controlling the forces imparted onto a pier during collision by an errant vessel. In one embodiment, force control is achieved through management of the collision energy (i.e. by controlled energy dissipation). In other embodiments, energy dissipation is achieved primarily through plastic deformation of a structural system that includes metal or other suitable materials or of a combination of energy dissipation systems or mechanisms. The system may be configured in a modular nature such that damaged components are easily replaceable, thereby minimizing the time period during which a protected structure is vulnerable following the application of a force that buckled one or more of the modular components.

Low energy collisions are expected to occur frequently during the operating life of a protection system. It is desirable that neither the system nor the vessel should require any repairs after such an event. For example, the velocity for a Class IV, standard hopper barge may be approximately 1 knot for low energy collisions. According to an exemplary embodiment configured for low energy collisions, both the protection system according to an exemplary embodiment of the present invention and barge are configured to behave elastically and do not suffer significant permanent damage. In one embodiment, the vessel's energy is delivered to the protection system, stored as potential energy therein and then given back to the vessel, forcing it to rebound. Some energy may be lost due to friction, minor damage to the barge, etc. In other embodiments, the elastic behavior of the protection system may be linear or nonlinear, e.g., in the case of a protection system with rubber components.

According to an exemplary embodiment configured for medium energy collisions, the protection system behaves elastically and does not suffer permanent damage. However, the vessel can undergo some limited inelastic deformation. In other embodiments, the vessel's energy (in excess of that needed to cause permanent deformation to the vessel) is delivered to the fender system, stored as potential energy in the fender and then given back to the vessel, forcing it to rebound. In still further embodiments, there is some additional energy lost due to friction, pile soil interaction, etc.

Medium energy collisions typically occur infrequently during the operating life of a fender system. For example, the velocity for a Class IV, standard hopper barge may be approximately 3 knots for medium energy collisions. According to an exemplary embodiment of the present invention, a protection system configured for medium energy collisions exhibits elastic behavior that may be linear or nonlinear, e.g., in the case of a protection system with rubber components.

High energy collisions are expected to occur rarely during the operating life of a fender system. The velocity for a Class IV, standard hopper barge may be approximately 5 knots for high energy collisions. In some embodiments, it is expected that both fender and barge will suffer extensive damage after such a collision. In other, more desirable embodiments, the impacting vessel may remain intact and at the same time have such diminished kinetic energy that it does not deliver a significant force to the bridge pier after penetrating through all or part of the protection system. In other embodiments of the protection system, the deformation and energy absorbed prior to failure/buckling of the modular components determines the energy remaining in the vessel that will be delivered to and create collision forces on the protected structure.

According to an exemplary embodiment of the present invention, a vessel protection system may be configured for low, medium and/or high energy collisions as described above.

Like reference characters denote like parts in the drawings.

FIGS. 1*a*, 1*b*, 1*c* and 1*d* show a pier protection system 100 and modular components 102 thereof according to an exemplary embodiment of the present invention.

FIG. 1*a* shows a plan view of a modular component 102 of pier protection system 100. Modular component 102 includes at least one left side plate 105, at least one right side plate 110, at least one strut 125 at the front and rear, four columns 145 joining the left side plate 105 and the right side plate 110 to front and rear struts 125, an energy dissipation unit 130, and at least one supporting member 135 configured to support the energy dissipation unit 130. Each of the left side plate 105 and right side plate 110 include a left member 115 and a right member 120. The left member 115 and right member 120 are configured to be attachable to columns 140 via at least one bolt 145 or other suitable attachment mechanism. Energy dissipation unit 130 is positioned inside modular component 102 and includes a plurality of adjacent cells arranged to dissipate energy from an outside force through plastic deformation of one or more cell walls.

Figure 1B:
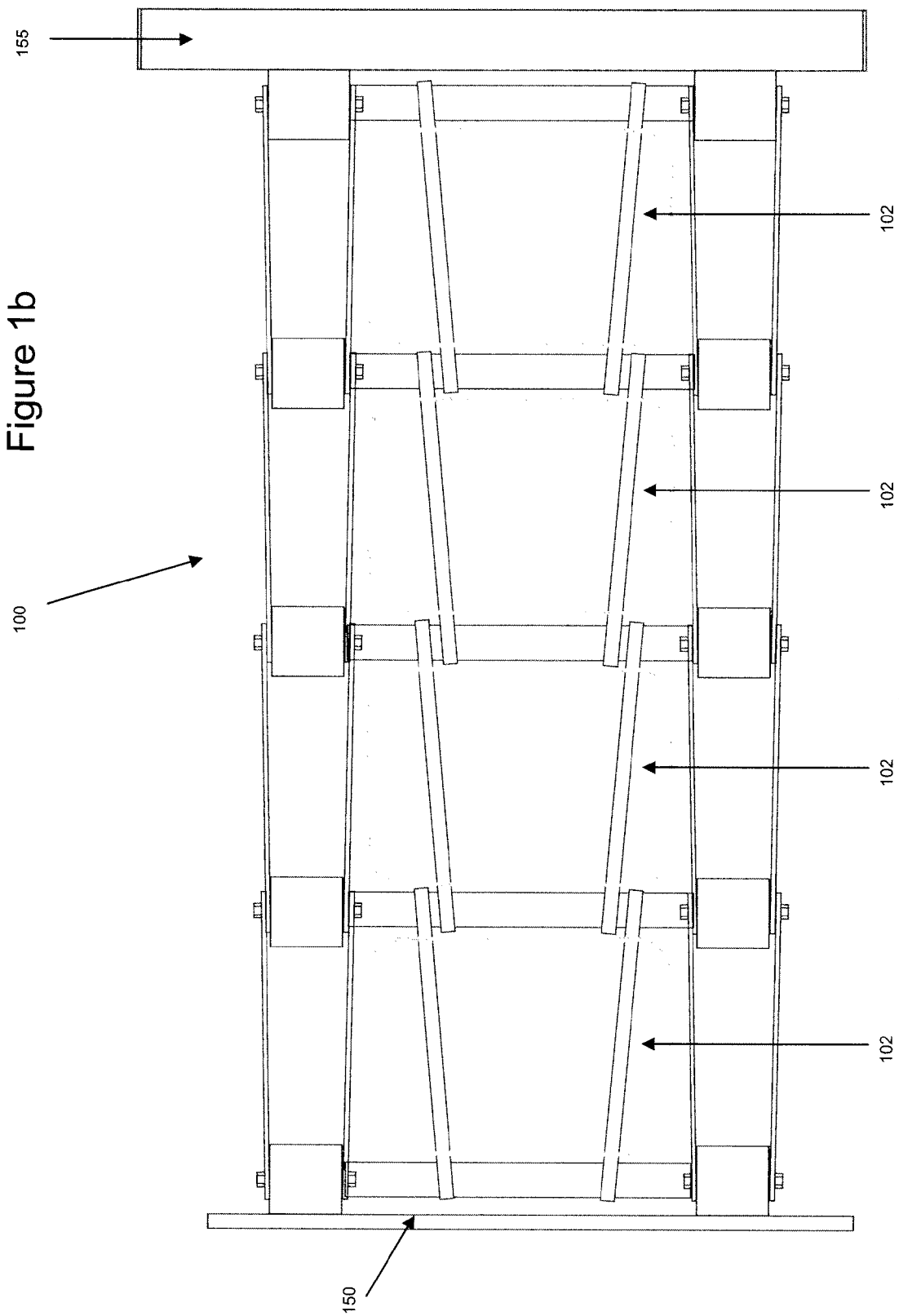
FIG. 1b is a plan view of a protection system incorporating a plurality of the modular component of FIG. 1a according to an exemplary embodiment of the present invention.

FIG. 1*b* shows a plan view of pier protection system 100 according to an exemplary embodiment of the present invention. The illustrated embodiment incorporates four modular components 102, however other embodiments may include more or less modular components arranged in various configurations. The pier protection system 100 may be configured to be attachable to a supporting structure 155, which may include a bridge pier or other marine support structure. The pier protection system 100 may further include at least one horizontal member 150 configured to transfer the energy of an applied force, such as a vessel impact, to the series of modular components 102.

Figure 1C:
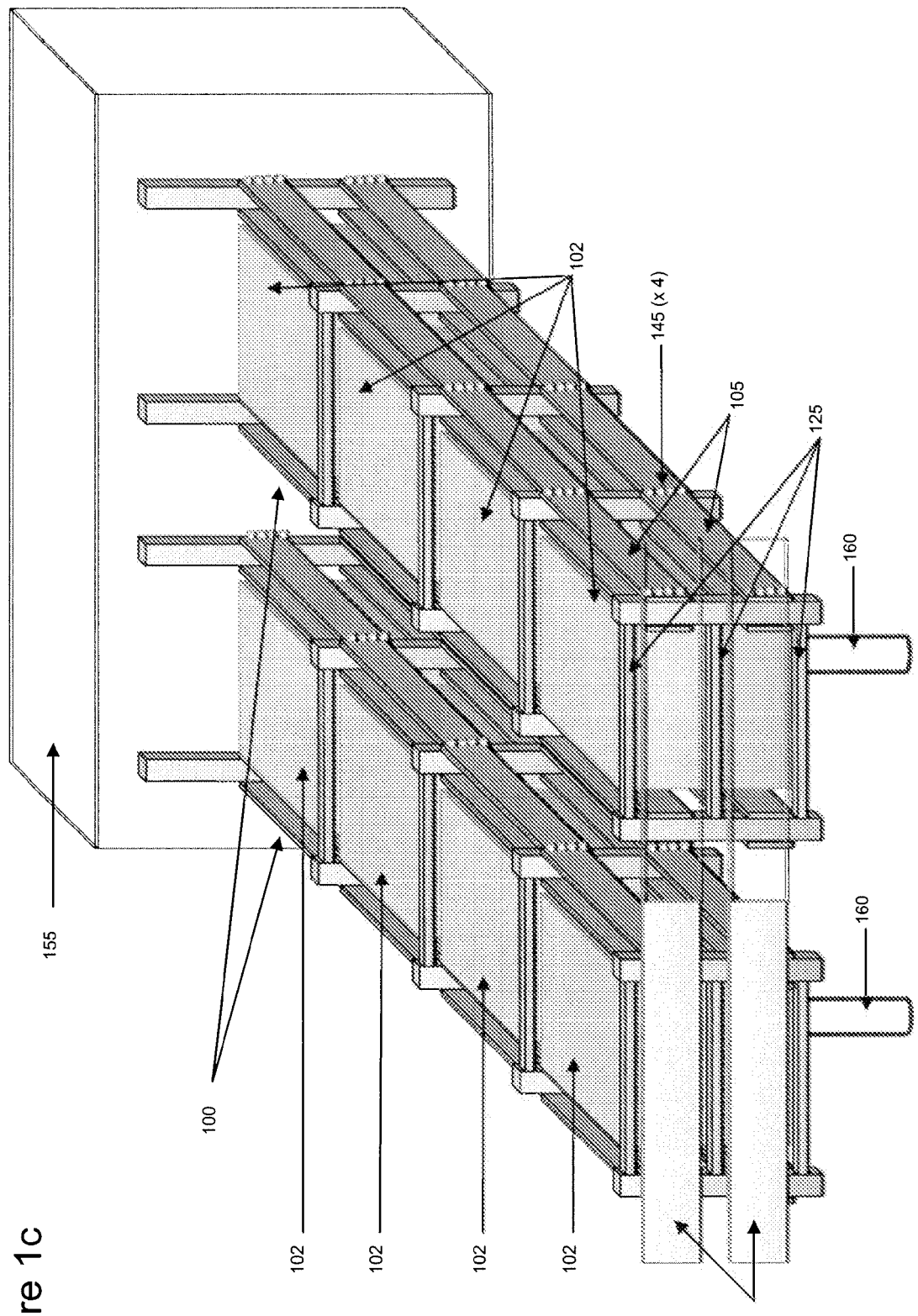
FIG. 1c is an isometric view of the protection system shown in FIG. 1b.

FIG. 1*c* shows an isometric view of a pair of pier protection systems 100 according to an exemplary embodiment of the present invention. The isometric view shows the modular components 102 having three struts 125 at the front and rear of each modular component 102, two left side plates 105 and two right side plates 110 (see FIG. 1*d*) which attach to columns 140 via four bolts 145, although these quantities may vary in other embodiments. Alternative suitable fastening mechanisms may also be used. Furthermore, while a pier protection system 100 may be configured to rest on the surface of the water surrounding supporting structure 155, one or more supporting members 160 configured to stabilize pier protection system 100 against the waterbed may be included. In certain embodiments, supporting member 160 may include a timber piling, a concrete piling, a fiber reinforced polymer piling, or any other appropriate supporting structure. In other embodiments, support may be achieved through attachments to supporting structure 155.

Figure 1D:
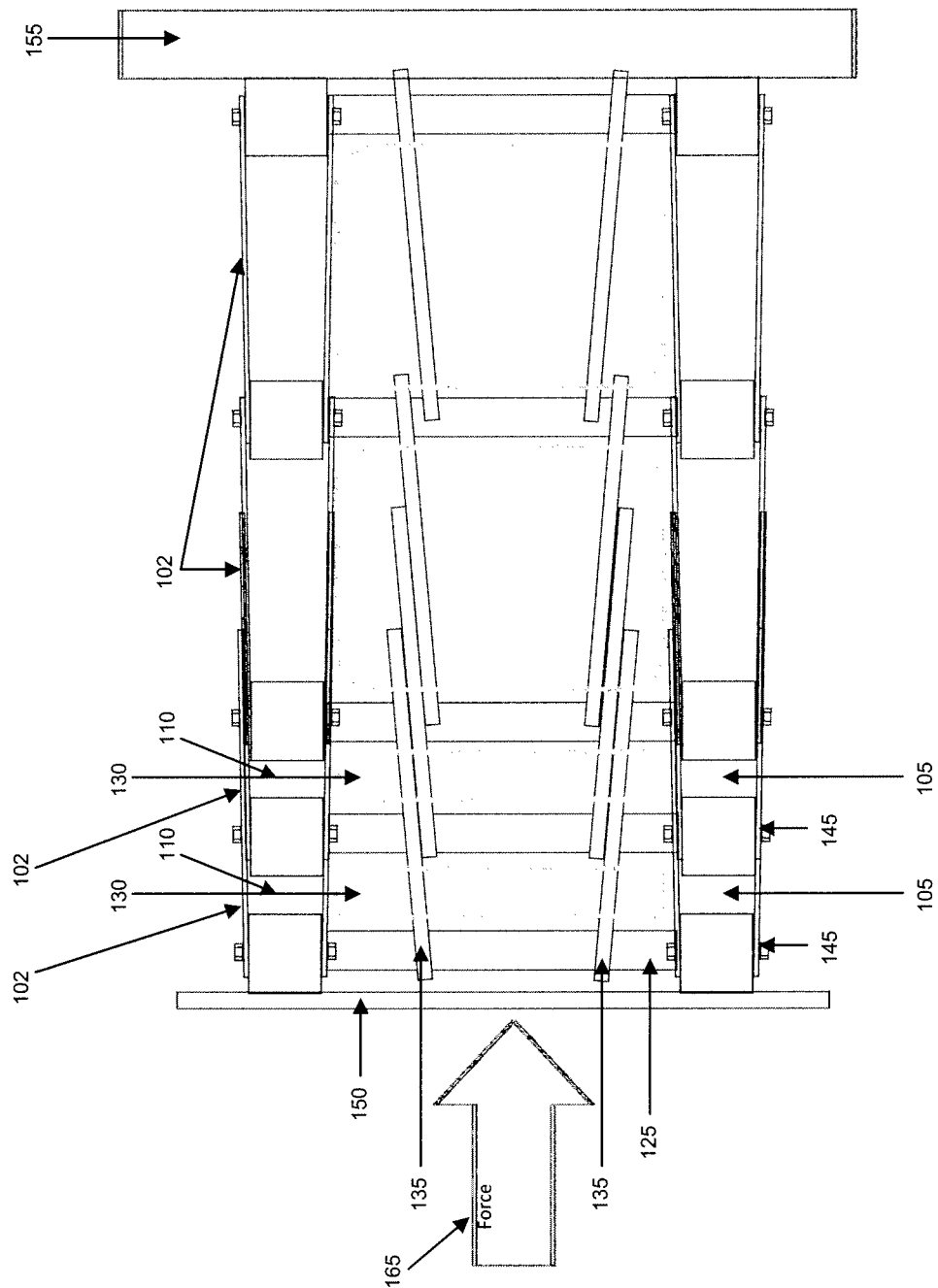
FIG. 1d is a plan view of the protection system shown in FIGS. 1b and 1c and further illustrating the effect of an external force on the system.

FIG. 1d is a plan view of the pier protection system 100 shown in FIGS. 1b and 1c and further illustrating the effect of an external force 165 on the system. Embodiments of the present invention may be configured to protect both a supporting structure and an impacting vessel/vehicle through the dissipation of the energy of the impact via the successive buckling or failure of at least one of a series of modular components. The successive buckling or failure of the modular components may be accomplished by a number of mechanisms. For example, as illustrated in FIG. 1d, pier protection system 100 is configured such that, as buckling occurs, a modular component 102 nearer the horizontal member 150 telescopes into the adjacent modular component 102 in the direction of the applied force 165. Specifically, the force 165 is transferred to the series of modular components 102 via horizontal member(s) 150. Bolts 145 are configured to tear upon application of a given force, thereby allowing left side plate 105 and right side plate 110 to slide in the direction of the force as energy dissipation unit 130 is crushed. Supporting members 135 may not be directly affixed to struts 125 and thus may be configured to freely slide out of the way as the telescoping mechanism of the series of modular components 102 is accomplished.

Dissipation of force 165 is achieved as energy dissipation units 130 are crushed. As force 165 is transferred to the modular component 102 adjacent to horizontal member 150, energy dissipation unit 130 contained therein dissipates the force as the cellular walls of energy dissipation unit 130 buckle, thereby dissipating the force through the formation of one or more plastic hinges. In certain embodiments, force 165 may be further dissipated by volume reduction if the cells of energy dissipation unit 130 are filled with a suitable substance, such as fluid, foam, or other suitable material. After all cells of energy dissipation unit 130 in modular component 102 adjacent to horizontal member 150 are buckled, if a portion of force 165 remains, remaining force 165 is transferred to the next adjacent modular component 102 as the first modular component 102 telescopes inward. Remaining force 165 is further dissipated by adjacent modular component 102 as described above. Dissipation of force 165 continues in this manner until either all of force 165 is dissipated, or all modular components 102 and energy dissipation units 130 contained therein are expended. In the latter scenario, a substantially reduced force 165 is transferred to supporting structure 155, but protection system 100 may be configured such that any such force presents little to no danger to the structural integrity of supporting structure 155. In certain embodiments, due to the modular nature of protection system 100, modular components 102 and/or partially or fully crushed energy dissipation units 130 are configured to be quickly replaced to minimize the vulnerability of supporting structure 155 to additional forces, such as another vessel impact. In other embodiments, only compromised energy dissipation units 130 and any torn bolts 145 need be replaced, as modular components 102 may be configured to be extended to their original (e.g. untelescoped) arrangement.

FIGS. 2a, 2b, 2c and 2d show a pier protection system 200 and modular components 202 thereof according to an exemplary embodiment of the present invention.

Figure 2A:
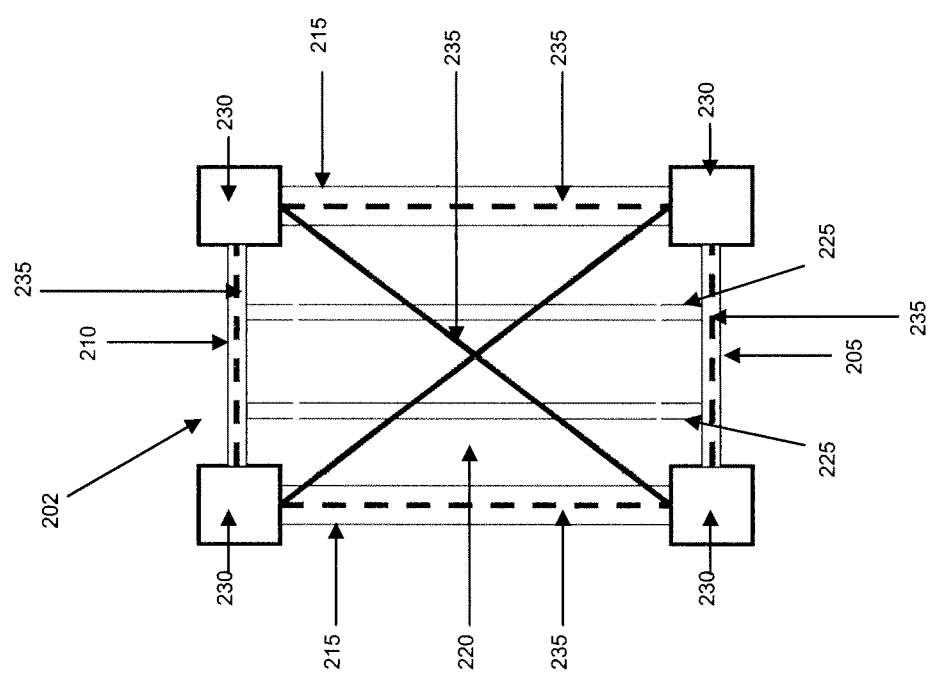
FIG. 2a is a plan view of a modular component of a protection system according to an exemplary embodiment of the present invention.

FIG. 2a shows a plan view of a modular component 202 of pier protection system 200. Modular component 202 includes at least one left side plate 205, at least one right side plate 210, at least one strut 215 at the front and rear, four columns 230 joining the left side plate 205 and the right side plate 210 to front and rear struts 215, an energy dissipation unit 220, at least one supporting member 225 configured to support the energy dissipation unit 220 and at least one bracing member 235 at the top, right side, left side and front of modular component 202. Energy dissipation unit 220 is positioned inside modular component 202 and includes a plurality of adjacent cells (see, e.g., FIGS. 3 through 6) arranged to dissipate energy from an outside force through plastic deformation of one or more cell walls.

FIG. 2b shows a plan view of pier protection system 200 according to an exemplary embodiment of the present invention. The illustrated embodiment incorporates four modular components 202, however other embodiments may include more or less modular components arranged in various configurations. The pier protection system 200 may be configured to be attachable to a supporting structure 245, which may include a bridge pier or other marine support structure. The pier protection system 200 further may include at least one horizontal member 240 configured to transfer the energy of an applied force, such as a vessel impact, to the series of modular components 202.

Figure 2C:
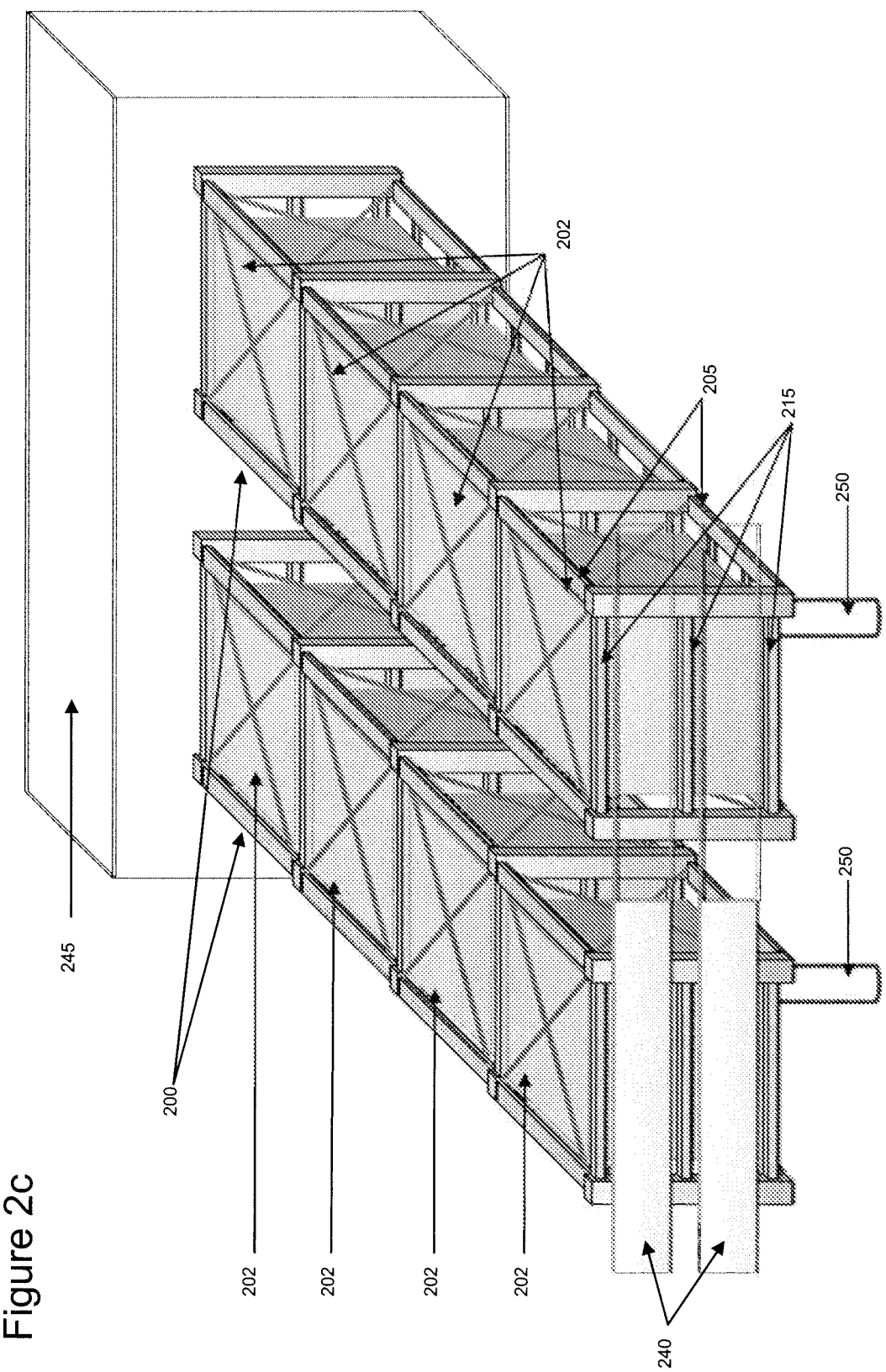
FIG. 2c is an isometric view of the protection system shown in FIG. 2b.

FIG. 2c shows an isometric view of a pair of pier protection systems 200 according to an exemplary embodiment of the present invention. The isometric view shows the modular components 202 having three struts 215 at the front and rear of each modular component 202, two left side plates 205 and two right side plates 210 (see FIG. 2d), although these quantities may vary in other embodiments. Alternative suitable fastening mechanisms may also be used. Furthermore, while a pier protection system 200 may be configured to rest on the surface of the water surrounding supporting structure 245, one or more supporting members 250 configured to stabilize pier protection system 100 against the waterbed may be included. In certain embodiments, supporting member 250 may include a timber piling, a concrete piling, a fiber reinforced polymer piling, or any other appropriate supporting structure. In other embodiments, support may be achieved through attachments to supporting structure 245.

Figure 2D:
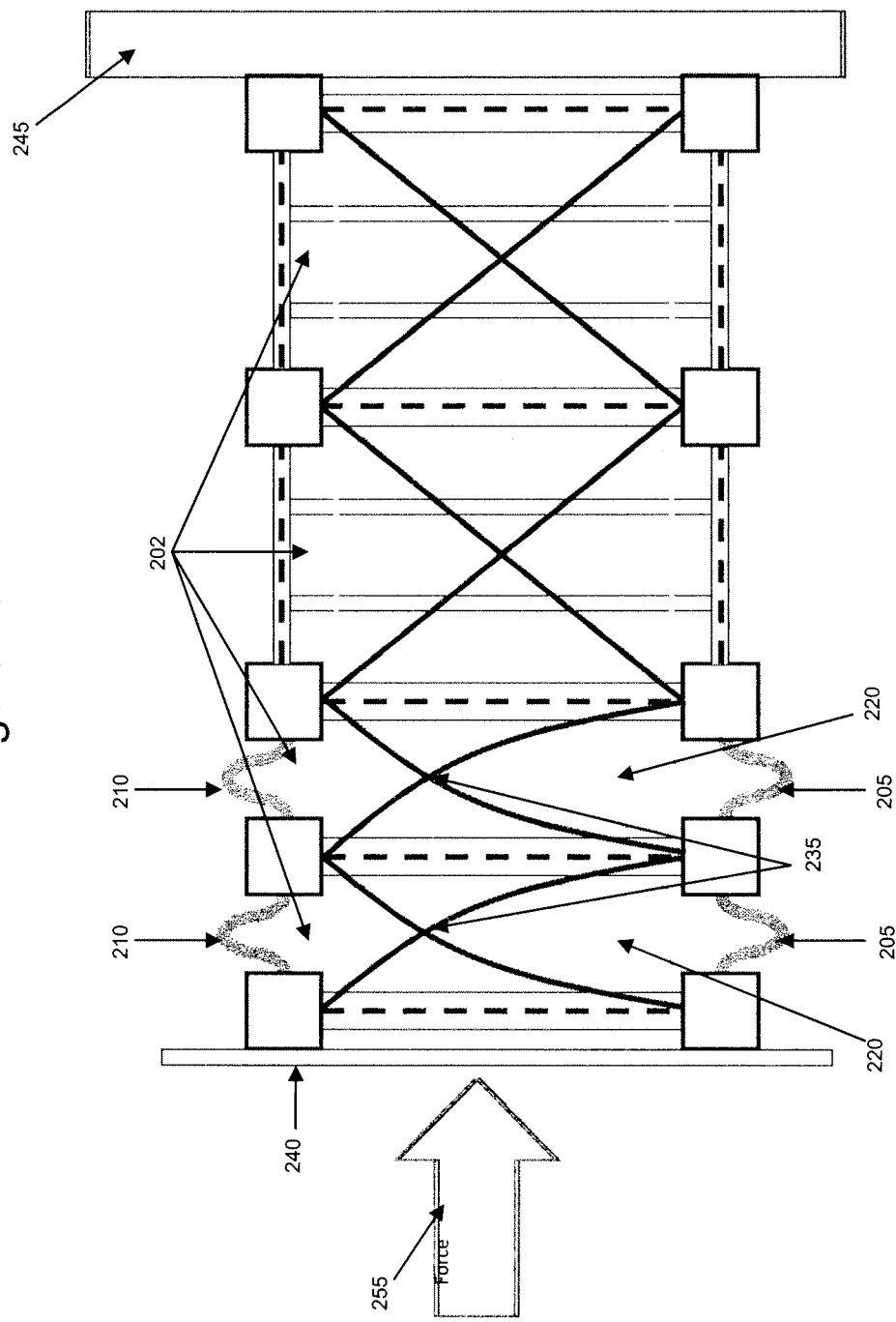
FIG. 2d is a plan view of the protection system shown in FIGS. 2b and 2c and further illustrating the effect of an external force on the system.

FIG. 2d is a plan view of the pier protection system 200 shown in FIGS. 2b and 2c and further illustrating the effect of an external force 255 on the system. As previously discussed, embodiments of the present invention may be configured to protect both a supporting structure and an impacting vessel/vehicle through the dissipation of the energy of the impact via the successive buckling of at least one of a series of modular components, and this successive buckling may be accomplished by a number of mechanisms. For example, as illustrated in FIG. 2d, pier protection system 200 is configured such that, as buckling occurs, corresponding pairs of left side plate 205 and right side plate 210 buckle, allowing a modular component 102 nearer the horizontal member 240 to compress into the adjacent modular component 102 in the direction of the applied force 255. Specifically, the force 255 is transferred to the series of modular components 202 via horizontal member(s) 240. Corresponding pairs of left side plates 205 and right side plates 210 are designed to give or buckled upon application of a given force, thereby allowing the corresponding modular component 202 to be compressed as energy dissipation unit 220 is crushed. Bracing members 235 are configured to provide lateral support and/or enhanced structural support to pier protection system 200 as modular components 202 are progressively crushed under the applied load of force 255.

Dissipation of force 255 is achieved as energy dissipation units 220 are crushed. As force 255 is transferred to the modular component 202 adjacent to horizontal member 240, energy dissipation unit 220 contained therein dissipates the force as the cellular walls of energy dissipation unit 220 buckle, thereby dissipating the force through the formation of one or more plastic hinges. In certain embodiments, force 240 may be further dissipated by volume reduction if the cells of energy dissipation unit 220 are filled with a suitable substance, such as water, foam, or other suitable material. After all cells of energy dissipation unit 220 in modular component 202 adjacent to horizontal member 240 are buckled, if a portion of force 255 remains, remaining force 255 is transferred to the next adjacent modular component 202 as the first modular component 202 compresses inward. Remaining force 255 is further dissipated by adjacent modular component 202 as described above. Dissipation of force 255 continues in this manner until either all of force 255 is dissipated, or all modular components 202 and energy dissipation units 220 contained therein are expended. In the latter scenario, a substantially reduced force 255 may transferred to supporting structure 245, but protection system 200 may be configured such that any such force presents little to no danger to the structural integrity of supporting structure 245. In certain embodiments, due to the modular nature of protection system 200, modular components 202 and/or partially or fully crushed energy dissipation units 220 are configured to be quickly replaced to minimize the vulnerability of supporting structure 245 to additional forces, such as another vessel impact. In other embodiments, only compromised energy dissipation units 220 and any deformed left side plates 105, right side plates 110 and bracing members 235 need be replaced, as modular components 202 may be configured to be extended to their original (e.g. uncompressed) arrangement.

According to certain embodiments of the present invention, including the embodiments described herein, protection systems may include energy dissipation units that include a plurality of adjacent cells. These cells may be configured to be empty (i.e., contain no solid/liquid substance) such that when loaded, the walls of the cells undergo high mode buckling to dissipate the energy load through the formation of one or multiple plastic hinges. In other embodiments, the cells may be configured to be filled with a solid or liquid material such that when loaded resulting in the crushing of one or more cells, the filler therein will dissipate energy through volume reduction or by escape of the filler from the cell structure. Such filler materials may include liquid, foam, or other suitable material.

According to certain embodiments of the present invention, energy dissipation units may be manufactured from a variety of suitable energy absorbing materials. In certain embodiments, for example, energy dissipation units may be manufactured from a metal—steel, for example—and configured to dissipate energy through plastic deformations. Such metal energy dissipation units may include individual metal components that are assembled into a complete unit by, for example, bolting or welding arrangements, to give two non-limiting examples. In other embodiments, energy dissipation unites may be manufactured from materials that allow for energy dissipation through large elastic-plastic deformations, such as high density polyethylene. Such energy dissipation units may be manufactured by extruding the material into the desired shape, or by affixing (through lashing, gluing, bolting, etc.) together previously manufactured tubular products of the desired material.

Figure 3D:
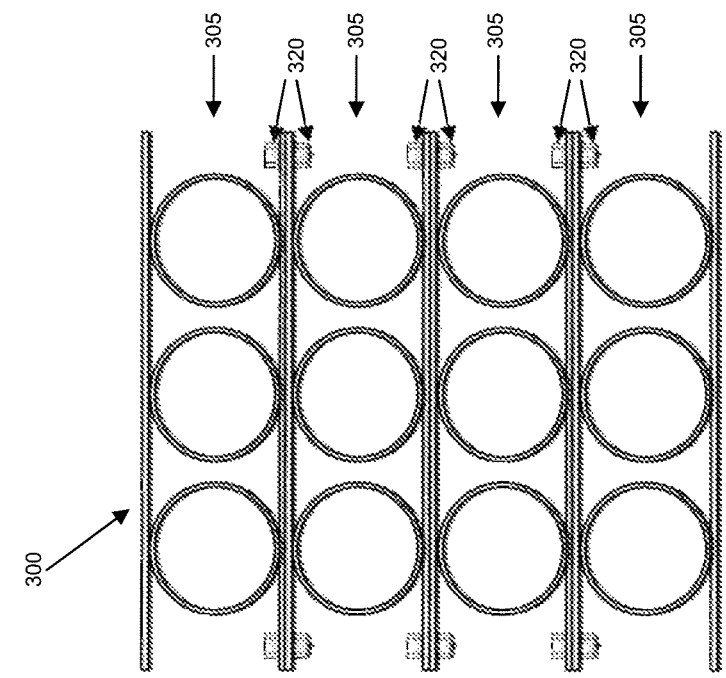
Figure 3C:
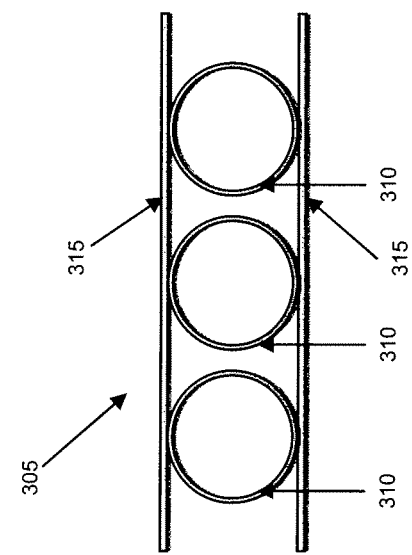

FIGS. 3*a* and 3*b* are plan views of an energy dissipation unit 300 and component thereof according to exemplary embodiments of the present invention. Basic unit 305 includes a plurality of hollow tubes 310 having a square transverse cross section and arranged in a row and positioned between two plates 315. In certain embodiments, tubes 310 may be of a variety of materials such as metal, high density polyethylene, fiber reinforced polymers, timber composites, or any other solid material. Tubes 310 may be affixed to plates 315 by welding, bolting, gluing or other suitable arrangement. Energy dissipation unit 300 includes a plurality of basic units 305 that may be affixed together by various mechanisms, such as with bolts 320 in the illustrated example. FIGS. 3*c* and 3*d* illustrate an alternative embodiment of basic unit 305 and energy dissipation unit 300 wherein tubes 310 have a circular transverse cross section. In other embodiments, tubes 310 may have a transverse cross section of any suitable geometric shape, open or closed. According to certain embodiments of the present invention, upon application of an external force, energy dissipation unit 300 may be configured to dissipate said force through the formation of one or more plastic hinges as the walls of tubes 310 buckle. Said force may be further dissipated by volume reduction if the hollow portion of tubes 310 are filled with a suitable substance, such as liquid, foam, or other suitable material. Thus, according to exemplary embodiments of the present invention, energy dissipation unit 300 may be used in a modular protection system as described herein. For example, energy dissipation unit 300 may be used as reference number 130 in the system illustrated in FIGS. 1*a*, 1*b*, 1*c* and 1*d*, or as reference number 220 in the system illustrated in FIGS. 2*a*, 2*b*, 2*c* and 2*d*.

FIGS. 4*a*, 4*b* and 4*c* are plan and isometric views of an energy dissipation unit 400 and components thereof according to exemplary embodiments of the present invention. Basic unit 405 includes a plurality of hollow tubes 410 having a square transverse cross section and arranged in rows of alternating vertical and horizontal arrangements. In certain embodiments, tubes 410 may be of a variety of materials such as metal, high density polyethylene, fiber reinforced polymers, timber composites, or any other solid material. Tubes 410 may be affixed to plates 415 or each other by welding, bolting, gluing, or other suitable arrangements. Energy dissipation unit 400 includes a plurality of basic units 405 positioned between two plates 415. FIGS. 4*a*, 4*b* and 4*c* illustrate tubes 410 as having square transverse cross sections. In other embodiments, tubes 410 may have a transverse cross section of any suitable geometric shape, open or closed. According to certain embodiments of the present invention, upon application of an external force, energy dissipation unit 400 may be configured to dissipate said force through the formation of one or more plastic hinges as the walls of tubes 410 buckle. Said force may be further dissipated by volume reduction if the hollow portion of tubes 410 are filled with a suitable substance, such as liquid, foam, or other suitable material. Thus, according to exemplary embodiments of the present invention, energy dissipation unit 400 may be used in a modular protection system as described herein. For example, energy dissipation unit 400 may be used as reference number 130 in the system illustrated in FIGS. 1*a*, 1*b*, 1*c* and 1*d*, or as reference number 220 in the system illustrated in FIGS. 2*a*, 2*b*, 2*c* and 2*d*.

Figure 5B:
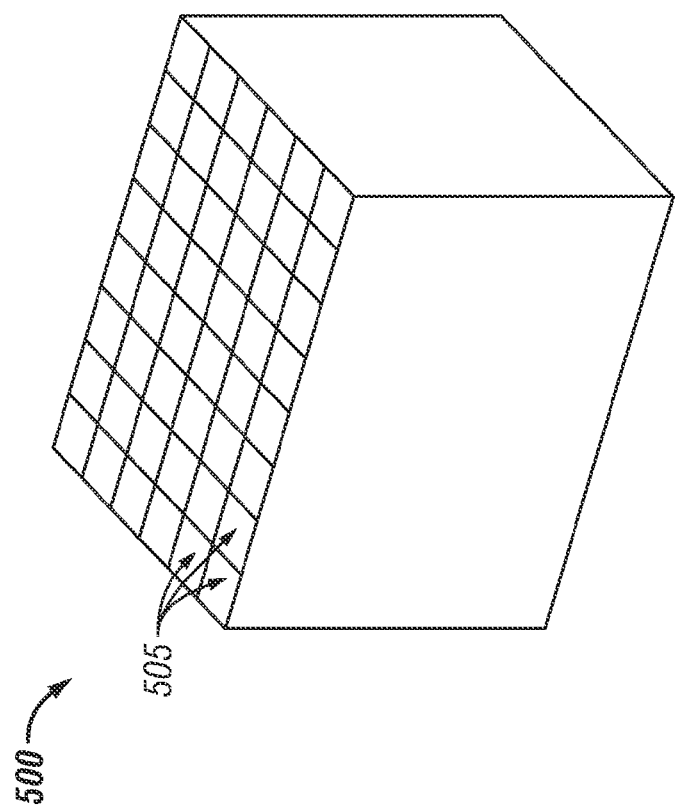
FIGS. 5a and 5b are plan and isometric views of an energy dissipation unit and components thereof according to exemplary embodiments of the present invention.
Figure 5A:
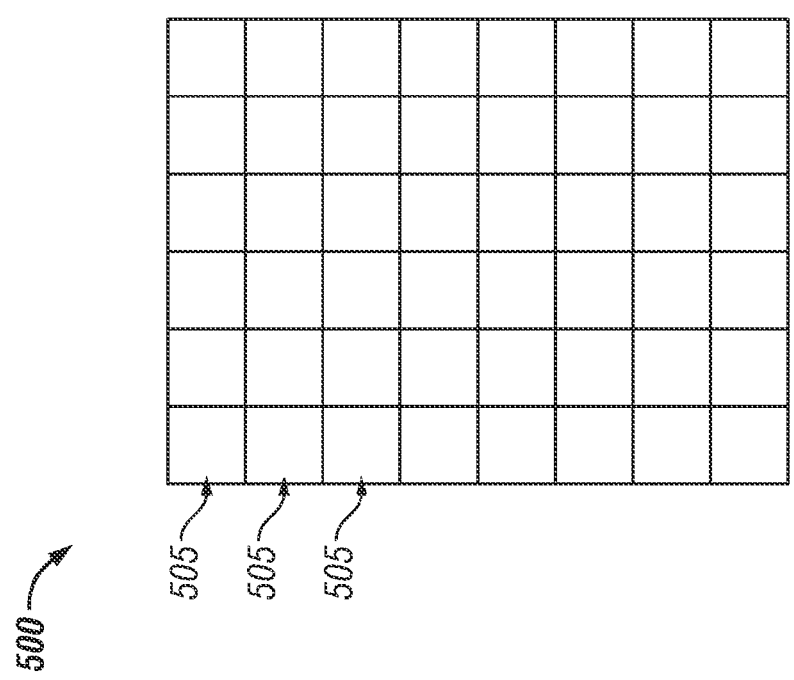

FIGS. 5*a* and 5*b* are plan and isometric views of an energy dissipation unit 500 according to an exemplary embodiment of the present invention. Energy dissipation unit 500 includes a plurality of square-shaped cells 505 and, in certain embodiments, may be manufactured from any suitable solid material, such as high density polyethylene, extruded to form the desired configuration. The cellular nature of energy dissipation unit 500 allows for the walls of one or more cells 505 to undergo high mode buckling upon the application of a force, thereby dissipating the energy of said force through the formation of one or more plastic hinges. In certain embodiments, cells 505 may be filled with a liquid or solid material such that upon buckling of one or more cells 505, energy is further dissipated via volume reduction. Thus, according to exemplary embodiments of the present invention, energy dissipation unit 500 may be used in a modular protection system as described herein. For example, energy dissipation unit 500 may be used as reference number 130 in the system illustrated in FIGS. 1*a*, 1*b*, 1*c* and 1*d*, or as reference number 220 in the system illustrated in FIGS. 2*a*, 2*b*, 2*c* and 2*d*.

Figure 6B:
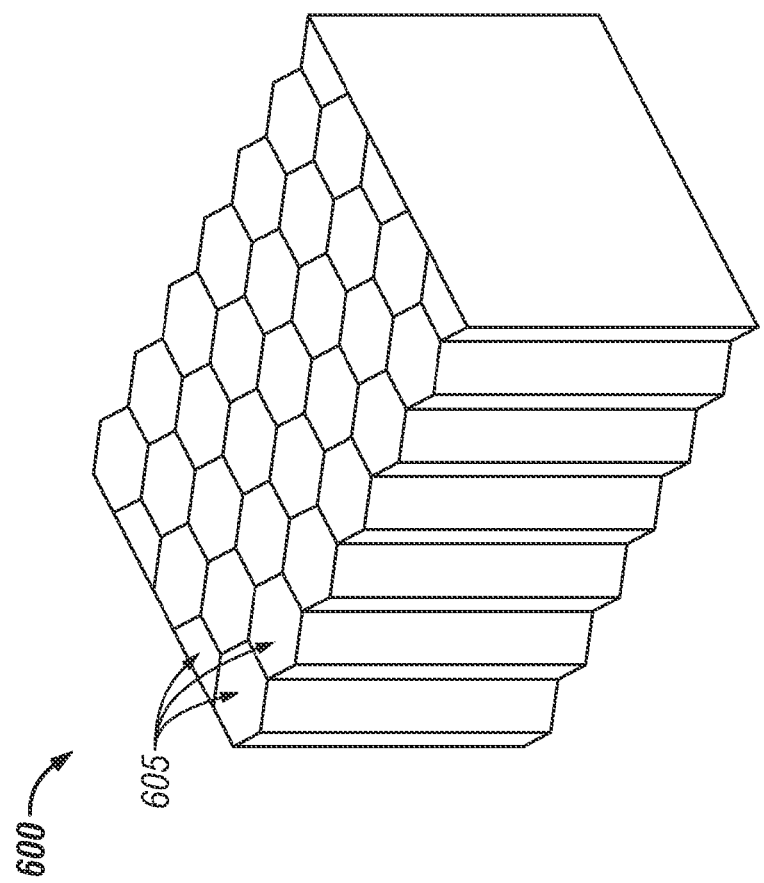
FIGS. 6a and 6b are plan and isometric views of an energy dissipation unit and components thereof according to exemplary embodiments of the present invention.
Figure 6A:
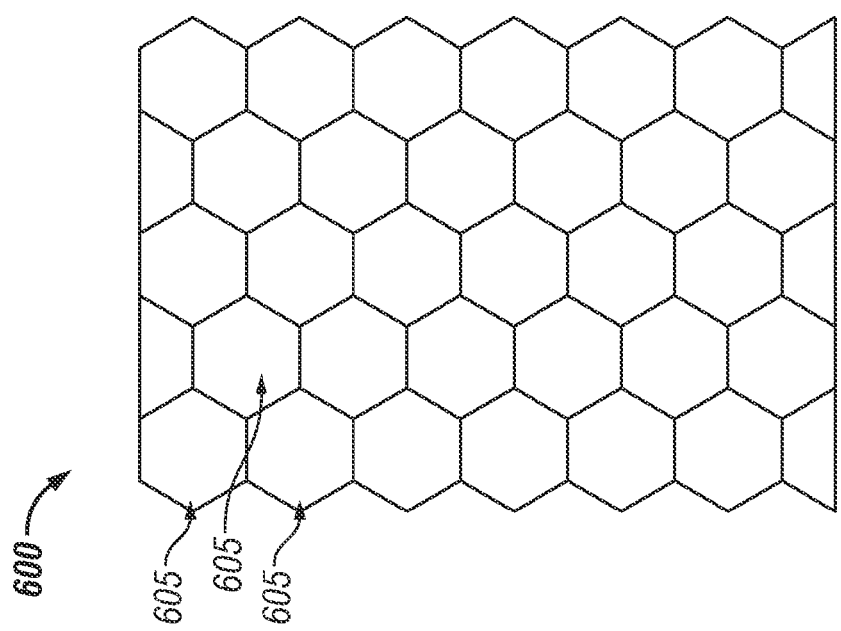

FIGS. 6*a* and 6*b* are plan and isometric views of an energy dissipation unit 600 according to an exemplary embodiment of the present invention. Like the embodiment illustrated in FIGS. 5*a* and 5*b*, energy dissipation unit 600 includes a plurality of cells 605, however the cells 605 of energy dissipation unit 600 have a hexagonal shape. In other embodiments, the shapes of the plurality of cells of an energy dissipation unit may be squares, rectangles, hexagons, polygons, or other appropriate geometric shape selected to achieve the desired energy dissipation upon buckling of the cellular walls. According to certain embodiments of the present invention, upon application of an external force, energy dissipation unit 600 may be configured to dissipate said force through the formation of one or more plastic hinges as the walls of cells 605 buckle. Said force may be further dissipated by volume reduction if cells 605 are filled with a suitable substance, such as liquid, foam, or other suitable material. Thus, according to exemplary embodiments of the present invention, energy dissipation unit 600 may be used in a modular protection system as described herein. For example, energy dissipation unit 600 may be used as reference number 130 in the system illustrated in FIGS. 1*a*, 1*b*, 1*c* and 1*d*, or as reference number 220 in the system illustrated in FIGS. 2*a*, 2*b*, 2*c* and 2*d*.

Figure 7:
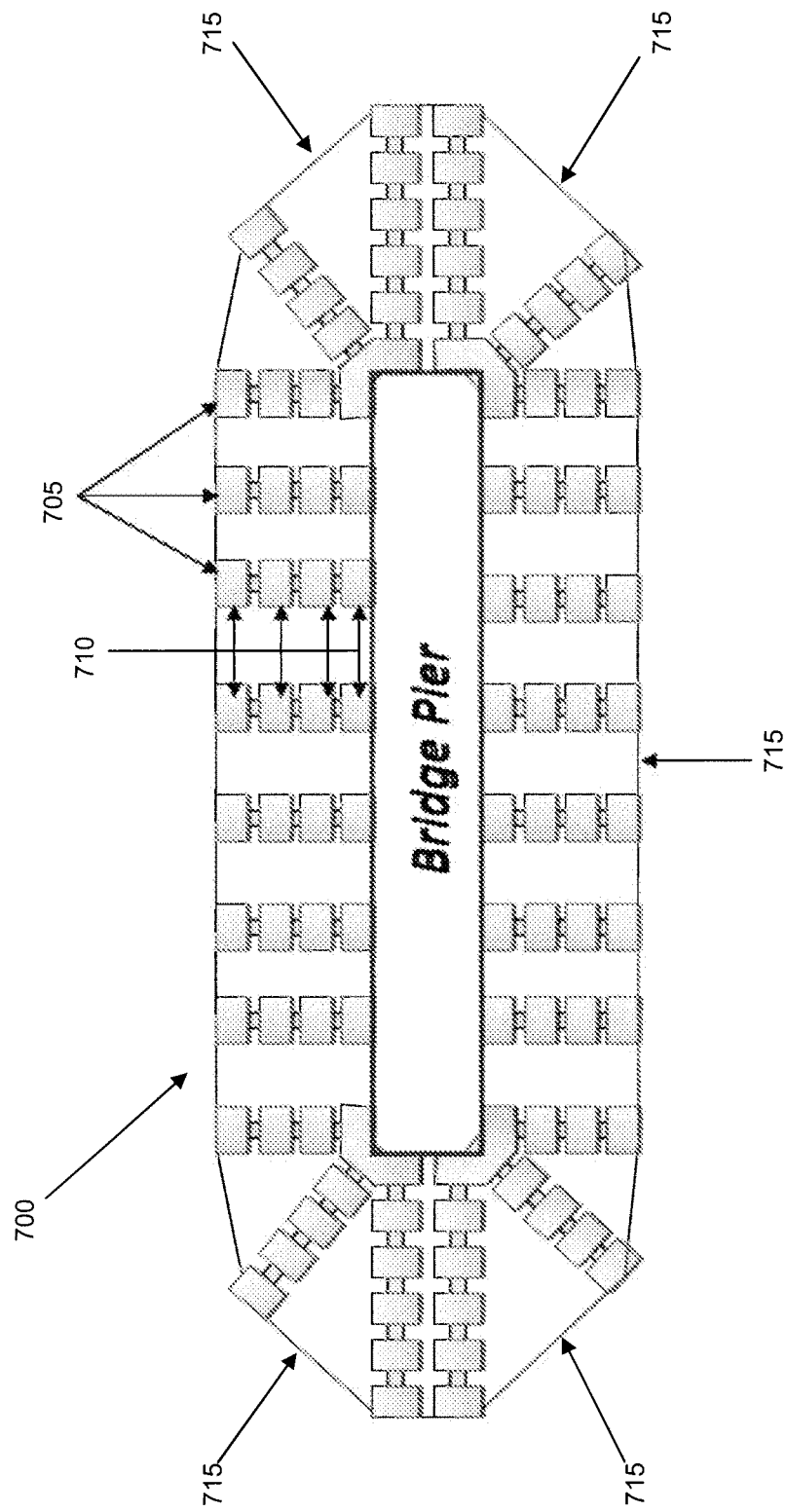
FIG. 7 is a plan view of a bridge pier protection system according to an exemplary embodiment of the present invention.

FIG. 7 is a plan view of a bridge pier protection system according to an exemplary embodiment of the present invention. Bridge pier protection system 700 includes a plurality of pier protection systems 705, each configured to dissipate energy through the successive buckling of modular components 710. A series of wales 715 is positioned such that the plurality of pier protection systems 705 is enclosed therein. Wales 715 are configured such that a force applied to the wales 715 at any point, such as from an impacting vessel, is transferred to one or more of the plurality of pier protection systems 705, which in turn dissipate the energy from the applied force. According to certain embodiments of the present invention, dissipation of the applied force may be achieved, as described herein, as energy dissipation units, such as those illustrated by FIGS. 3-6 (and all sub-parts thereof), contained within modular components 710 of pier protection systems 705 are crushed. The force may be dissipated through progressive crushing of energy dissipation units contained in adjacent modular components 710 within a given protection system 705, beginning with the modular component 710 furthest from the protected structure. Force transferred to any given protection system 705 may be dissipated as described herein, for example, as modular components 710 telescope inward (See FIG. 1*d* and related discussion) or as modular components 710 are compressed inward (See FIG. 2*d* and related discussion).

Figure 8:
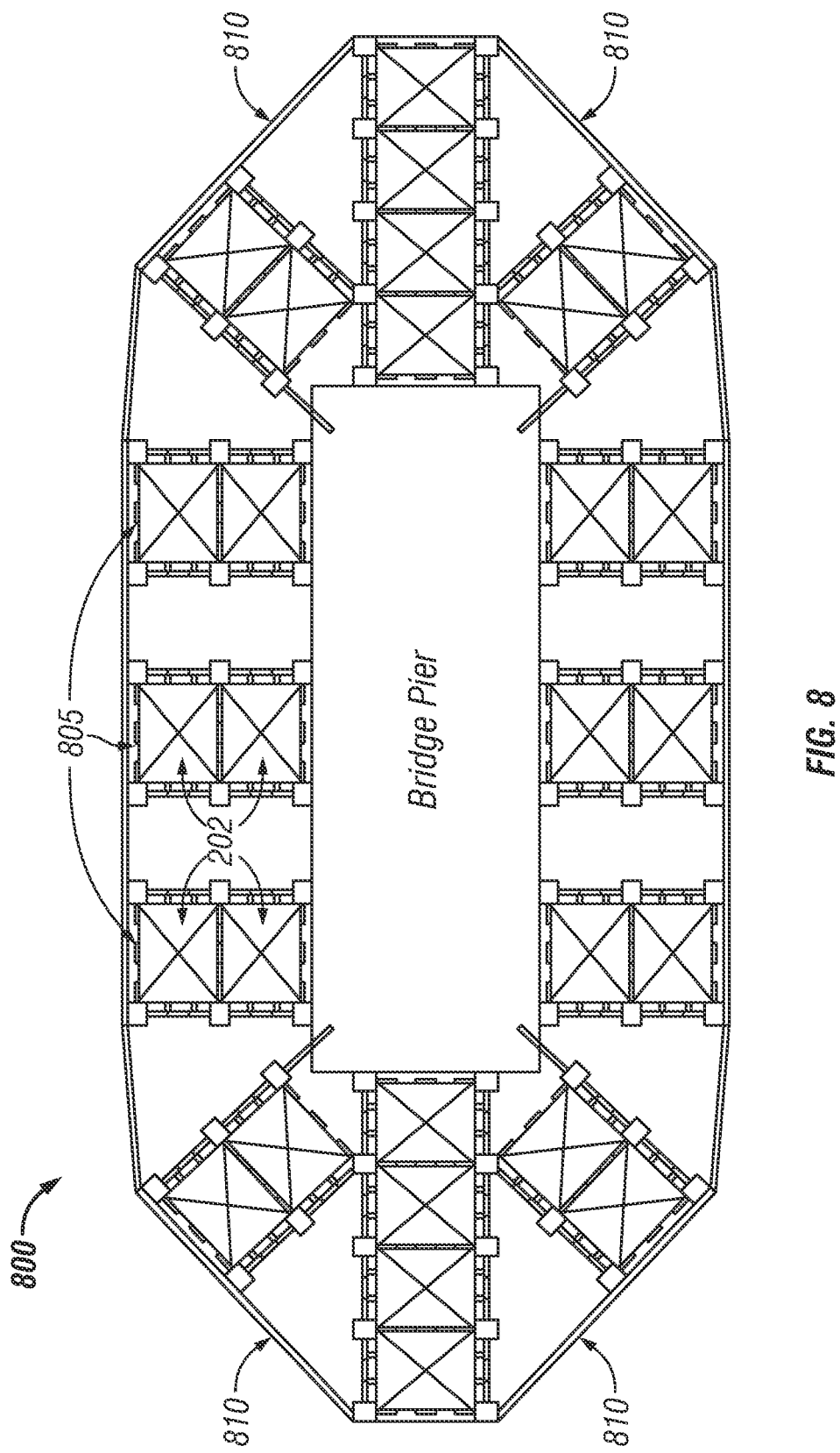
FIG. 8 is a plan view of a bridge pier protection system according to an exemplary embodiment of the present invention.

FIG. 8 provides a more detailed plan view of a bridge pier protection system incorporating modular components, e.g., modular components as illustrated in FIG. 2*a*, according to an exemplary embodiment of the present invention. Bridge pier protection system 800 includes a plurality of pier protection systems 805, each configured to dissipate energy through the successive buckling of one or more modular components. In the illustrated example, the pier protection systems 805 incorporate the modular components 202 as illustrated in FIG. 2*a*. A series of wales 810 is positioned to form a barrier such that the plurality of pier protection systems 805 is enclosed therein. In certain embodiments, wales 815 may link the horizontal members (not shown) of individual pier protection systems 805, should said protection systems incorporate such a member as illustrated, for example, in FIGS. 1*b* (at 150), 1*c* (at 150), 2*b* (at 240) and 2*c* (at 240). Wales 810 are configured such that a force applied to the wales 810 at any point, such as from an impacting vessel, is transferred to one or more of the plurality of pier protection systems 805, which in turn dissipate the energy from the applied force through the progressive compression of modular components 202, for example, as demonstrated in FIG. 2*d*. In other embodiments, such a bridge pier protection system may also incorporate modular components such as those illustrated in FIG. 1*a* and configured such that the energy from an applied force is dissipated as said modular components telescope into adjacent components as illustrated in FIG. 1*d*. According to certain embodiments of the present invention, dissipation of the applied force may be achieved, as described herein, as energy dissipation units, such as those illustrated by FIGS. 3-6 (and all sub-parts thereof), contained within modular components 202 of pier protection systems 805 are crushed. The force may be dissipated through progressive crushing of energy dissipation units contained in adjacent modular components 202 within a given protection system 805, beginning with the modular component 202 furthest from the protected structure. Force transferred to any given protection system 805 may be dissipated as described herein, for example, as modular components 202 telescope inward (See FIG. 1*d* and related discussion) or as modular components 202 are compressed inward (See FIG. 2*d* and related discussion).

Figure 9:
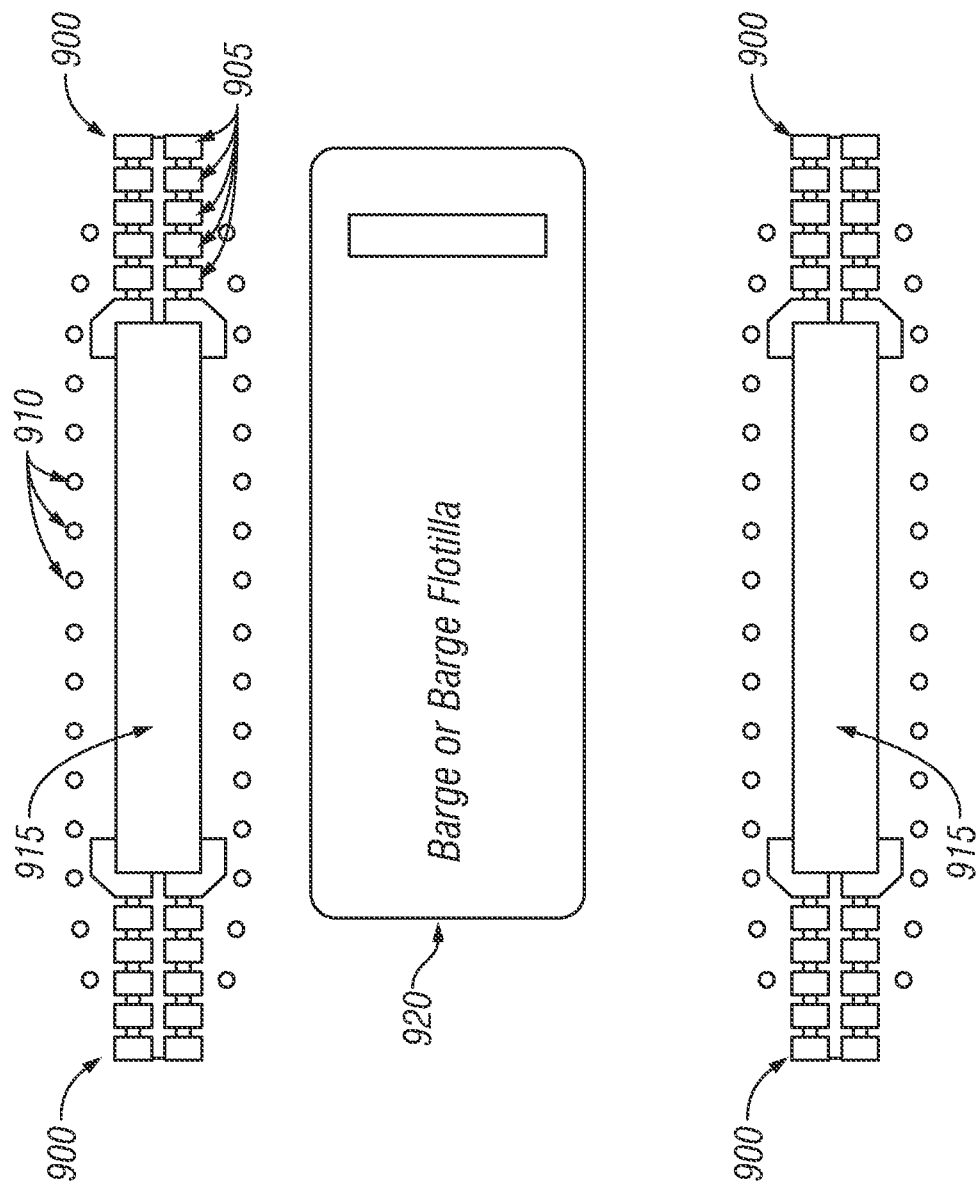
FIG. 9 is a plan view of a bridge pier protection system according to an embodiment of the present invention.

FIG. 9 is a plan view of a bridge pier protection system according to an embodiment of the present invention. FIG. 9 illustrates how a bridge pier protection system may be incorporated with current protection systems, such as preexisting pilings. At least one pier protection system 900, each including a plurality of modular components 905 and configured to dissipate energy through the successive buckling of modular components 905, may be attached to either end of a bridge pier 915. Pier protection systems 900 may thus be positioned to protect bridge pier 915 from a "head on" impact from a vessel 920, while existing pilings 910 provide protection from sideways collisions. Pilings 910 may be made from timber, concrete, fiber reinforced polymer, or other such appropriate material. According to certain embodiments of the present invention, dissipation of the applied force may be achieved, as described herein, as energy dissipation units, such as those illustrated by FIGS. 3-6 (and all sub-parts thereof), contained within modular components 905 of pier protection systems 900 are crushed. The force may be dissipated through progressive crushing of energy dissipation units contained in adjacent modular components 905 within a given protection system 900, beginning with the modular component 905 furthest from the protected structure 915. Force transferred to any given protection system 900 may be dissipated as described herein, for example, as modular components 905 telescope inward (See FIG. 1*d* and related discussion) or as modular components 905 are compressed inward (See FIG. 2*d* and related discussion).

Embodiments of the present invention also include a method for dissipating an applied force. According to an exemplary embodiment of the present invention, such a method includes the steps of: providing one or a plurality of modular components, each of which contains and energy dissipation unit comprising a plurality of adjacent cells; arranging the plurality of modular components in series such that the force contacts the first modular component of the series; dissipating the force by the buckling of at least one cell wall of the adjacent cells of the energy dissipation unit of the first modular component of the series; and upon the buckling of at least one cell wall of the adjacent cells of the energy dissipation unit of a modular component, transferring the remaining force to the next adjacent modular component in the series until either all of the force has been dissipated or no further modular components remain in the series.

While the embodiments are described with reference to various implementations and exploitations, it will be understood that these embodiments are illustrative and that the scope of the invention(s) is not limited to them. In general, embodiments of a collision protection system as described herein may be implemented using methods, facilities, and devices consistent with any appropriate structural or mechanical system(s). Many variations, modifications, additions, and improvements are possible.

For example, plural instances may be provided for components, operations or structures described herein as a single instance. Boundaries between various components, operations and functionality are depicted somewhat arbitrarily, and particular operations are illustrated within the context of specific illustrative configurations. Other allocations of functionality will also fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Furthermore, embodiments of the present invention are not limited to marine applications. Rather, embodiments of the present invention may be configured to protect any structure from the application of an external force, including but not limited to, marine vessels, motor vehicles, and other such sources of a force capable of causing damage to a protected structure.

What is claimed is:

1. A system, comprising:
    a plurality of modular components, each of said modular components including:
        a left side plate;
        a right side plate;
        a front strut;
        a rear strut;
        a front left column joining the left side plate and the front strut;
        a front right column joining the right side plate and the front strut;
        a rear left column joining the left side plate and the rear strut;
        a rear right column joining the right side plate and the rear strut;
        an energy dissipation unit positioned inside each modular component and including a plurality of adjacent cells; and
        at least one supporting member configured to support the energy dissipation unit,
    a first end; and
    a second end including at least one horizontal member configured to transfer an energy from an applied force to the modular components;
    wherein the modular components are configured in series between the first end and the second end such that the front strut, front left column and front right column of a modular component are, respectively, the rear strut, rear left column and rear right column of an adjacent modular component;
    wherein the first end is attachable to a marine support structure;
    wherein the system is configured to rest on the surface of a body of water with the first end proximate to a marine support structure; and
    wherein the system is configured to dissipate the energy introduced from the applied force applied to the horizontal member through at least one of the progressive buckling and failure of at least one modular component and the buckling of at least one cell wall of the plurality of adjacent cells.

2. The system of claim 1, wherein the adjacent cells are comprised of hollow tubes arranged in rows.

3. The system of claim 2, wherein the hollow tubes are arranged such that each tube may buckle or hinge without contacting an adjacent tube of the same row.

4. A system, comprising:
    a plurality of modular components, each of said modular components including:
        a left side plate;
        a right side plate;
        a front strut;
        a rear strut;
        a front left column joining the left side plate and the front strut;
        a front right column joining the right side plate and the front strut;
        a rear left column joining the left side plate and the rear strut;
        a rear right column joining the right side plate and the rear strut; and
        an energy dissipation unit positioned inside each modular component and including a plurality of cells;
    a first end; and
    a second end, the modular components configured between the first end and the second end;
    wherein the system is configured to dissipate an energy introduced from a force applied to the second end through the progressive buckling of at least one modular component and the buckling of at least one cell wall of the cells; and
    wherein the system attaches to a marine support structure.

5. The system of claim 4, wherein the plurality of cells are hollow tubes.

6. The system of claim 5, wherein the the hollow tubes are arranged rows such that each hollow tube may buckle or hinge without contacting an adjacent hollow tube of the same row.

7. The system of claim 4, wherein the system is configured to rest on the surface of a body of water surrounding the marine support structure.

8. The system of claim 7, further comprising at least one supporting member configured to stabilize the system against the bed of the body of water.

9. The system of claim 8, wherein the supporting member is at least one of a timber piling, a concrete piling and a fiber reinforced polymer piling.

10. The system of claim 8, wherein the system is configured to be supported by attachments to the support structure.

11. The system of claim 7, wherein the force is an impact of a marine vessel against the horizontal member.

12. The system of claim 11, wherein the system is configured to dissipate the energy from the impact such that damage to both the marine support structure and the marine vessel is minimized.

13. The system of claim 4, wherein the second end includes at least one horizontal member.

14. The system of claim 13, wherein the horizontal member is configured to transfer the energy of an applied force to the modular components.

15. The system of claim 4, wherein the modular components are configured between the first end and the second end such that the front strut, front left column and front right column of a modular component are, respectively, the rear strut, rear left column and rear right column of an adjacent modular component.

16. The system of claim 4, wherein each of the modular components further includes at least one supporting member configured to retain the energy dissipation unit within the modular component.

17. The system of claim 4, wherein each of the left side plates and the right side plates comprise:
    a left member; and
    a right member,
wherein the left member and right member are configured to be attachable to either side of a column.

18. The system of claim 17, wherein the series of left side plates and the series of right side plates are configured to compress by telescoping in response to the force applied to the horizontal member such that the modular components progressively compress in series, beginning with the modular component nearest the horizontal member, as the corresponding energy dissipation units buckle in response to the force.

19. The system of claim 18, wherein the left member and right member of each left side plate and each right side plate are attached to opposite sides of a corresponding column via at least one bolt, the bolt configured to tear in response to the force applied to the horizontal member to allow telescoping of the series of left side plates and the series of right side plates as the modular components are compressed.

20. The system of claim 4, wherein the series of left side plates and the series of right side plates are configured to progressively buckle in series, beginning with the left and right side plates positioned nearest the horizontal member, in response to the force applied to the horizontal member such that the modular components compress in series, beginning with the modular component nearest the horizontal member, as the corresponding energy dissipation units buckle in response to the force.

21. The system of claim 20, further comprising at least one brace positioned over the top side, left side, right side and front side of each modular component, the braces configured to enhance the lateral stability of the system.

22. The system of claim 4, wherein the cells of the energy dissipation units are configured to dissipate the energy from the applied force through the formation of one or more plastic hinges as the walls of the cells buckle.

23. The system of claim 4, wherein the cells of the energy dissipation units are filled with one of liquid, foam, or other suitable material.

24. The system of claim 23, wherein the cells of the energy dissipation units are configured to dissipate the energy from the applied force through one of volume reduction.

25. The system of claim 23, wherein the cells of the energy dissipation units are configured to dissipate the energy from the applied force through the escape from one or more cells of the liquid, foam, or other suitable material therein.

26. The system of claim 4, wherein the energy dissipation units are manufactured from one of a metal, resin, plastic, timber, high density polyethylene or any other suitable solid material.

27. The system of claim 4, wherein the cells of the energy dissipation units are shaped as one of a circle, a square, a rectangle, a hexagon, a polygon or any other closed or open shape.

28. The system of claim 4, wherein each of the energy dissipation units comprises:
    a plurality of tubes; and
    a plurality of vertical plates,
wherein the tubes are arranged in an array such that the vertical plates separate the rows of the array and each tube is positioned between exactly two vertical plates.

29. The system of claim 28, wherein the shape of a transverse cross section of the tubes is one of a circle, a square, a rectangle, a hexagon, a polygon or any other closed or open shape.

30. The system of claim 28, wherein the tubes are manufactured from one of a metal, resin, plastic, timber, high density polyethylene or any other suitable solid material.

31. The system of claim 28, wherein the tubes are attached to the horizontal plates by one of gluing, bolting, or welding.

32. The system of claim 4, wherein each of the energy dissipation units comprises:
    a plurality of tubes arranged vertically;
    a plurality of tubes arranged horizontally;
    a first plate; and
    a second plate,
wherein alternating rows of horizontally arranged tubes and vertically arranged tubes are positioned between the first plate and the second plate.

33. The system of claim 32, wherein the shape of a transverse cross section of the tubes is one of a circle, a square, a rectangle, a hexagon, or a polygon.

34. The system of claim 32, wherein the tubes are manufactured from one of a metal, resin, plastic, timber, high density polyethylene or any other suitable solid material.

35. The system of claim 32, wherein the tubes are attached to the first plate, the second plate, or each other by one of gluing, bolting, or welding.

36. The system of claim 28, wherein the tubes are arranged such that each tube may buckle or hinge without contacting an adjacent tube.

37. A bridge pier protection system, comprising:
    a plurality of protection systems, each comprising:
        a plurality of modular components, each of said modular components including:
            a left side plate;
            a right side plate;
            a front strut;
            a rear strut;
            a front left column joining the left side plate and the front strut;
            a front right column joining the right side plate and the front strut;
            a rear left column joining the left side plate and the rear strut;
            a rear right column joining the right side plate and the rear strut; and
            an energy dissipation unit positioned inside each modular component and including a plurality of adjacent cells;
        a first end; and
        a second end, the modular components configured between the first end and the second end; and a plurality of wales;
wherein the protection systems are configured to be attachable to a marine support structure at the first ends;
wherein the protection systems are spaced around all or a portion of the support structure;
wherein the wales are positioned to link the second ends of the protection systems to form a continuous barrier, the barrier configured to transfer an energy of a force applied thereto to one or more of the protection systems.

38. A marine structure protection system comprising:
A plurality of modular components, arranged in series and defining a first system end and a second system end;
A plurality of energy dissipation units disposed inside each modular component, each energy dissipation unit including a plurality of cells;
Wherein the system is configured to dissipate impact energy applied to the second end of the system, through progressive buckling of at least one modular component and the buckling of at least one cell wall of the plurality of cells; such that the plurality of cells are comprised of hollow tubes arranged in rows such that each tube may buckle or hinge without contacting an adjacent tube of the same row; wherein the system is in proximity to a water line.

* * * * *